United States Patent
Reik et al.

(10) Patent No.: US 6,668,953 B1
(45) Date of Patent: Dec. 30, 2003

(54) POWER TRAIN HAVING AN INTERNAL COMBUSTION ENGINE, ENERGY CONVERTER, CLUTCH, AND ACCESSORY

(75) Inventors: Wolfgang Reik, Buhl (DE); Thomas Pels, Achern (DE); Dierk Reitz, Baden-Baden (DE)

(73) Assignee: LuK Lamellan und Kunpplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 09/630,696

(22) Filed: Aug. 1, 2000

(30) Foreign Application Priority Data

Aug. 2, 1999 (DE) .......................... 199 36 315

(51) Int. Cl.$^7$ .............................................. B60K 25/00
(52) U.S. Cl. ...................................... 180/53.8; 180/165
(58) Field of Search ................. 180/165, 53.8, 180/65; 192/85 CA, 91 A, 87.11

(56) References Cited

U.S. PATENT DOCUMENTS

| | | | | |
|---|---|---|---|---|
| 3,734,259 A | * | 5/1973 | Ashfield | 192/112 B |
| 4,126,200 A | * | 11/1978 | Miller et al. | 180/165 |
| 4,131,171 A | * | 12/1978 | Keyes | 180/54.1 |
| 4,132,283 A | * | 1/1979 | McCurry | 180/165 |
| 4,171,029 A | * | 10/1979 | Beale | 180/54 R |
| 4,305,488 A | * | 12/1981 | McIntosh | 192/219 |
| 4,393,964 A | * | 7/1983 | Kemper | 477/6 |
| 4,495,451 A | * | 1/1985 | Barnard | 318/150 |
| 4,495,836 A | * | 1/1985 | Cohen | 475/31 |
| 4,597,463 A | * | 7/1986 | Barnard | 180/165 |
| 4,753,078 A | * | 6/1988 | Gradner, Jr. | 60/668 |
| 4,787,492 A | * | 11/1988 | Ball et al. | 192/48.8 |
| 5,224,563 A | * | 7/1993 | Iizuka et al. | 180/65.3 |
| 5,337,871 A | * | 8/1994 | Testerman | 192/85 R |
| 5,384,521 A | | 1/1995 | Coe | 318/161 |
| 5,558,173 A | * | 9/1996 | Sherman | 180/53.8 |
| 5,577,588 A | * | 11/1996 | Raszkowski | 192/113.35 |
| 5,722,502 A | * | 3/1998 | Kubo | 180/65.4 |
| 5,845,731 A | * | 12/1998 | Buglione et al. | 180/65.2 |
| 5,846,155 A | * | 12/1998 | Taniguchi et al. | 477/2 |
| 5,847,470 A | * | 12/1998 | Mitchell | 290/45 |
| 5,903,061 A | * | 5/1999 | Tsuzuki et al. | 290/40 C |
| 6,019,183 A | * | 2/2000 | Shimasaki et al. | 180/165 |
| 6,048,288 A | | 4/2000 | Tsujii et al. | 477/5 |
| 6,053,842 A | * | 4/2000 | Kitada et al. | 477/5 |
| 6,093,974 A | * | 7/2000 | Tabata et al. | 290/40 R |
| 6,098,735 A | * | 8/2000 | Sadarangani et al. | 180/65.2 |
| 6,116,364 A | * | 9/2000 | Taguchi et al. | 180/65.2 |
| 6,149,544 A | * | 11/2000 | Masberg et al. | 477/13 |
| 6,170,587 B1 | * | 1/2001 | Bullock | 180/69.6 |
| 6,209,672 B1 | * | 4/2001 | Severinsky | 180/65.2 |
| 6,223,106 B1 | * | 4/2001 | Yano et al. | 701/22 |

FOREIGN PATENT DOCUMENTS

| DE | 199 23 851 A 1 | 12/1999 |
|---|---|---|
| DE | 199 41 705 A 1 | 3/2000 |

* cited by examiner

Primary Examiner—Lesley D. Morris
Assistant Examiner—Paul Royal, Jr.
(74) Attorney, Agent, or Firm—Alfred J. Mangels

(57) ABSTRACT

A power train for a motor vehicle including an internal combustion engine, a power transmission, and an energy converter positioned between the engine and the transmission. A first clutch is positioned between the engine and the energy converter and a second clutch is positioned between the power transmission and the energy converter. The energy converter is operatively connected with at least one accessory for driving the accessory by energy derived either from the rotational motion of the engine crankshaft or from rotational motion transferred from the vehicle's drive wheels through the transmission.

31 Claims, 3 Drawing Sheets

POWER TRAIN HAVING AN INTERNAL COMBUSTION ENGINE, ENERGY CONVERTER, CLUTCH, AND ACCESSORY

BACKGROUND OF THE INVENTION

1. Field of the Invention

The present invention relates to a power train, especially for a motor vehicle. More particularly, the present invention relates to a power train that includes an internal-combustion engine, a power output element, such as a transmission, positioned downstream of the engine in a power transmission path, and an energy conversion machine arranged in the power transmission path between the engine and the power output element, whereby the engine can be uncoupled from the power output element and/or from the energy conversion machine by at least one clutch.

2. Description of the Related Art

A power train of a type known in the art includes an engine, a transmission, and preferably an electrical machine or a flywheel, which is commonly designated an inertial energy device and which as a rule can be uncoupled by one clutch from the engine and by another clutch from the transmission. For example, when in the decelerating mode, such a design allows uncoupling the engine and, where called for, to shut it off, whereby with the clutch between the transmission and the inertial energy device engaged, the latter will acquire energy from the drive wheels through the transmission and, if appropriate, can supply the energy to an energy accumulator. Thus the inertial energy device acts as an energy conversion machine that converts the kinetic energy into electrical energy when applied to an electrical machine, or into rotational energy when applied to a flywheel. The energy so stored is available when restarting the engine, or it can be utilized for additional power when the vehicle is accelerating.

Such an energy-saving operation of the power train with a stopped engine involves a significant drawback. While the engine is shut off, accessories, which typically are mounted on the end of the drive shaft away from the transmission, will not be driven, that is, such accessories will not operate during the engine's inactivity. That condition amounts to a shortcoming with respect to safety-related accessories such as power steering pumps, vacuum pumps for power braking, and also adversely affects comfort-enhancing accessories, such as air-conditioning compressors.

Accordingly, accessories already have been proposed that can be driven while uncoupled from the crankshaft, for example by being powered electrically. Such accessories however are expensive and also incur a significantly higher energy drain.

Moreover, the space available to integrate energy converters is frequently very limited, in particular in the case of transversely-mounted front engines.

Accordingly, it is an object of the present invention to provide a power train allowing energy-saving operation of at least the safety-related accessories, or those relating to comfort, the power train of the invention allowing economical and energy-saving manufacture and operation. Moreover, it is another object of the invention to reduce the axial space required by the power train.

SUMMARY OF THE INVENTION

This problem is solved by providing a power train, in particular one for vehicles, which includes at least an engine, a power output system configured in the power transmission path downstream of the engine, such as a transmission, and an energy converter arranged in the power transmission path between the engine and the power output system. The engine is detachably coupled by at least one clutch to the power output system and/or the energy converter and at least one accessory is drivingly connected to the energy converter, or it constitutes the converter.

Such a power train advantageously is fitted with a first and a second clutch, one of which separates the energy converter from the engine and the other of which separates the energy converter from the power output system. The accessory at least relates to safety or enhances comfort, such as a pump, a compressor, or the like. For example, an accessory can include a power steering pump, a power brake booster, or a vacuum pump to service a power brake booster, or a compressor, for example an air-conditioning compressor. It should be understood that additional accessories also can advantageously be included in the design of the invention. Moreover, an additional or several additional accessories can advantageously be made to operate in association with the energy converter.

Preferably, the energy converter is arranged coaxially about the axis of the drive shaft of the power train. Thus, it can be mounted coaxially with the crankshaft or coaxially with the transmission input shaft. It also can be advantageous to mount the energy converter approximately axially parallel to the drive shaft axis and to provide the power transmission path between the drive shaft axis and the energy converter in the form of a belt drive, a continuously variable drive, a gear drive, or the like, for example using a chain drive or a gear drive. In a further advantageous manner, the at least one accessory can be arranged axially parallel to the drive shaft axis, or it can be arranged in a unitary structure that includes the accessory and the energy converter. Within the conception of the present invention, furthermore, and similar to a belt drive, several units, for example the energy converter and at least one accessory, can be drivingly connected by a belt drive at the front side of the transmission.

If when decelerating the engine is standing idle, the clutch between it and the inertial energy storage system, functioning as an energy converter, can be disengaged. And if the clutch between the energy converter and the transmission is engaged, or if there is no clutch connected with the transmission, the kinetic energy of the vehicle can be transferred to the energy converter. In that manner the energy converter can supply energy directly to at least one accessory by way of the transfer of converted energy, or the accessory can be directly driven by the energy converter, the energy from which is conveyed at the same time that the vehicle is slowing down.

In this respect it can be advantageous, depending on the desired vehicle motion, either by retarding movement through the storage of energy in the energy converter, or by a desired acceleration of movement when the engine is standing idle, or, for example, to start the engine by means of the energy converter, to engage or disengage in a known manner the at least one clutch between the engine and the energy converter, or, if there is a second clutch between the energy converter and the transmission, to engage or disengage the second clutch. In addition to supplying at least one accessory, it can be advantageous to use the energy converter to change kinetic energy into another form of energy. This latter form of energy can be energy of rotation, for example when the energy converter includes a flywheel, or electrical energy if the energy converter is an electrical machine, or it can be thermodynamic energy if the energy converter is a compressor, for example for compressing a critical gas, or a vacuum pump, or the like. It should be understood that the energy converter can convey such input energy to an appropriately designed storage device for disposition, or an accessory, for example an air-conditioning compressor, also can receive and store energy and, if called for, can feed that energy into the overall power train.

An advantageous embodiment of this invention concerns a power train with a continuously variable transmission (CVT) the transmission ratio of which is adjusted by sets of disks that are movable by an hydraulic pump, as disclosed in German Patent Publication DE 199 23 851. Such hydraulic pumps are frequently driven by the transmission input shaft. If there is at least one clutch provided between the energy converter and the engine, then if the clutch is in a disengaged condition, for example during recuperation or when the motor vehicle is being driven, then the hydraulic pump can be driven by the energy converter. The operational connection between the hydraulic pump, acting as an accessory in the sense of the present application, and the energy converter can be a belt drive or a chain drive, preferably also having a variably adjustable transmission ratio, or a gear drive, a friction wheel drive, or split power gearing. In an especially advantageous manner, that embodiment can include an additional clutch between the CVT and the energy converter, as a result of which the energy converter can, substantially independently of the rotational speeds of the transmission input shaft and of the crankshaft, drive the hydraulic pump in the disengaged or in the slipping condition of the clutches, and thereby advantageous operation of those elements can be attained, especially with a variably adjustable transmission ratio between the hydraulic pump and the energy converter. In one aspect, for example, the energy-converter's flywheel mass can be accelerated during braking of the motor vehicle, and the hydraulic pump can be operated by rotational energy while the vehicle is stopped. Of course, during this phase additional electrical energy can be gained from the rotational energy, or electrical energy can be converted into rotational energy, especially if a substantially long vehicle stop is anticipated. A resulting advantage, for example, is that when starting and at low engine rotational speeds enough pressure is available to adjust the sets of disks, and thereby the transmission ratio, by means of the pressure made available by the hydraulic pump, and as a consequence the engine can transfer more driving power during the starting process

BRIEF DESCRIPTION OF THE DRAWINGS

The invention is further explained below in relation to the following drawings in which.

DESCRIPTION OF THE PREFERRED EMBODIMENTS

Figure 1:
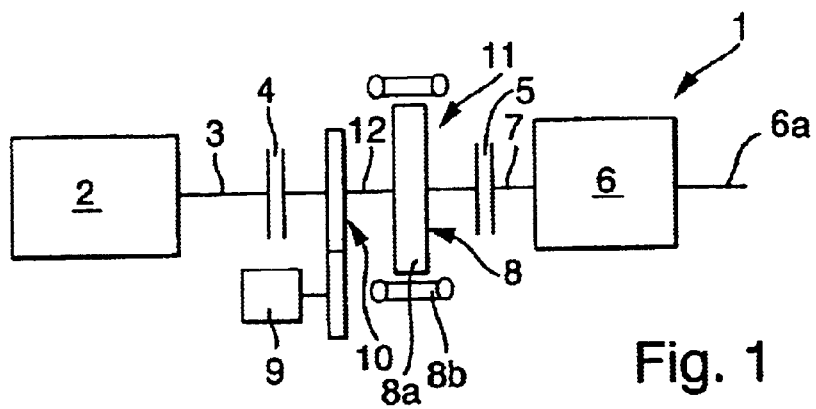
FIG. 1 schematically shows an embodiment of a power train in accordance with the present invention.

FIG. 1 shows a power train 1 that includes an internal combustion engine 2, which can be connected to a transmission input shaft 7 of a transmission 6 by means of a drive shaft such as crankshaft 3. Arranged in the power transmission path between the two shafts 3, 7 is an inertial energy device 11, which includes an energy converter 8, and an accessory 9. Inertial energy device 11 can be uncoupled from the power train by means of two clutches 4, 5.

Engine 2 can be a piston engine of a known type with several cylinders, for example two through eight in-line or V-mounted cylinders, wherein the engine control can be correlated with the method of operation of inertial energy device 11. Thereby engine 2 can be operated in start/stop modes, depending on acceleration and deceleration, and the vehicle can be operated in a coasting mode. Inertial energy device 11 can serve as the sole drive power source, or it can add to the power of engine 3, or it can recover energy and can start the engine directly or by impulses. Particularly in the absence of clutch 4, the engine can gain the benefit of measures to reduce the engine's braking torque, for example by providing combustion chamber valves which during deceleration can be opened sufficiently wide so that engine 2 with its correspondingly reduced braking torque can be carried along without a clutch 4 when inertial energy device 11 is driven by the vehicle's kinetic energy.

Each of clutches 4, 5 can be friction clutches or form-locking clutches, and they can be controlled in certain respects to automatically engage and disengage, for example by means of an hydraulic or pneumatic system of master and slave cylinders, whereby the master cylinder can be actuated by an electric motor. Particularly for low-cost vehicles, it can furthermore be advantageous to manually operate at least one clutch, preferably shifting clutch 5.

Inertial energy device 11 is in this embodiment in the form of an electrical machine 8 with a rotor 8a, and it includes a radially external stator 8b that is mounted in a stationary manner to a housing. Machine 8 is drivingly connected by an operative connection 10 with an accessory 9. This embodiment also concerns a hybrid design, wherein accessory 9 is axially parallel with crankshaft 3, and electrical machine 8, acting as an energy converter, is coaxial with transmission input shaft 7. It is to be understood that both units, accessory 9 and electrical machine 8, can be arranged coaxially about transmission input shaft 7 or crankshaft 3, in particular to reduce the axial installation space, or that electrical machine 8 can be connected by means of the same operative connection 10 to be axially parallel with crankshaft 3. Accessory 9 represents a safety-related accessory and/or a comfort-promoting accessory, whereby several units also can be directly drivingly connected with energy converter 8 and thereby form a part of inertial energy device 11.

It can be especially advantageous, particularly when it is desired to utilize the geometry of an already-existing power train, to position the accessory in the space that originally had been set aside for a starter. Accessory 9 can be provided in the form of a pump and/or compressor to produce a pressure or vacuum for air-conditioning, power steering, power brakes, and the like.

Advantageously, operative connection 10 can be in the form of a belt drive, but it also can be a gear connection, or a continuously adjustable drive with a variably adjustable transmission ratio.

Transmission 6, connected by clutch 5 to inertial energy device 11, can be a manual transmission, which preferably can be automated using appropriate automating means, or it can be an automatic transmission, which can be an automatic multi-step transmission, a continuously variable transmission, or a split-power continuously variable transmission (geared/neutral). Transmission 6 conveys to the drive wheels (not shown) through transmission output shaft 6a the torque received from engine 2 or from inertial energy device 11, and supplies kinetic energy of the vehicle where applicable from the drive wheels through transmission 6 and transmission input shaft 7 to inertial energy device 11, where it is converted by the energy converter into, for example, rotational energy, thermodynamic energy, and/or, as shown in this instance, into electrical energy by an electrical machine 8 and then to be stored in a suitable energy storage device (not shown).

Accessory 9 and, in suitable other embodiments, further accessories can be geared together and also to energy converter 8 at different gear ratios by means of operative connection 10. At least one accessory 9 and/or energy converter 8 can be provided with a preferably self-switching transmission, whereby one shift of the transmission can take place between at least two different gear ratios, for example as a function of the applied torque, of the direction of the torque, and/or of the rotational speed of energy converter 8, of accessory 9, of crankshaft 3, and/or of transmission input shaft 7. One such transmission acting as the operative connection between accessory 9 and energy converter 8 is described and discussed in German Patent Publication DE 199 41 705.9, the entire disclosure of which is hereby incorporated by reference herein to the same extent as if fully rewritten. It can also be advantageous to detect at least one of the parameters such as the rotational speed of energy converter 8, of accessory 9, of shafts 3, 7, and/or their torques, and/or their rotation directions, using an appropriate sensor, and to analyze such detected parameters and to control the transmission by means of a suitable control strategy.

In a particularly advantageous design example, a transmission, such as shown for example in FIGS. 1a through 1d of German Patent Publication DE 199 41 705.9, can be arranged with crankshaft 3, shaft 12 of inertial energy device 11, or on transmission input shaft 7, and the inertial energy device is an electrical machine, wherein accessory 9 is connected by operative connection 10 with the transmission, and the transmission includes a neutral position which advantageously is accurately controllable. When engine 2 is shut off, the transmission can be moved into the neutral position and accessory 9 can be operated by electrical machine 8 independently of the gear reductions in the transmission, and at its optimal operating point or at its nominal rotational speed.

Figure 2:
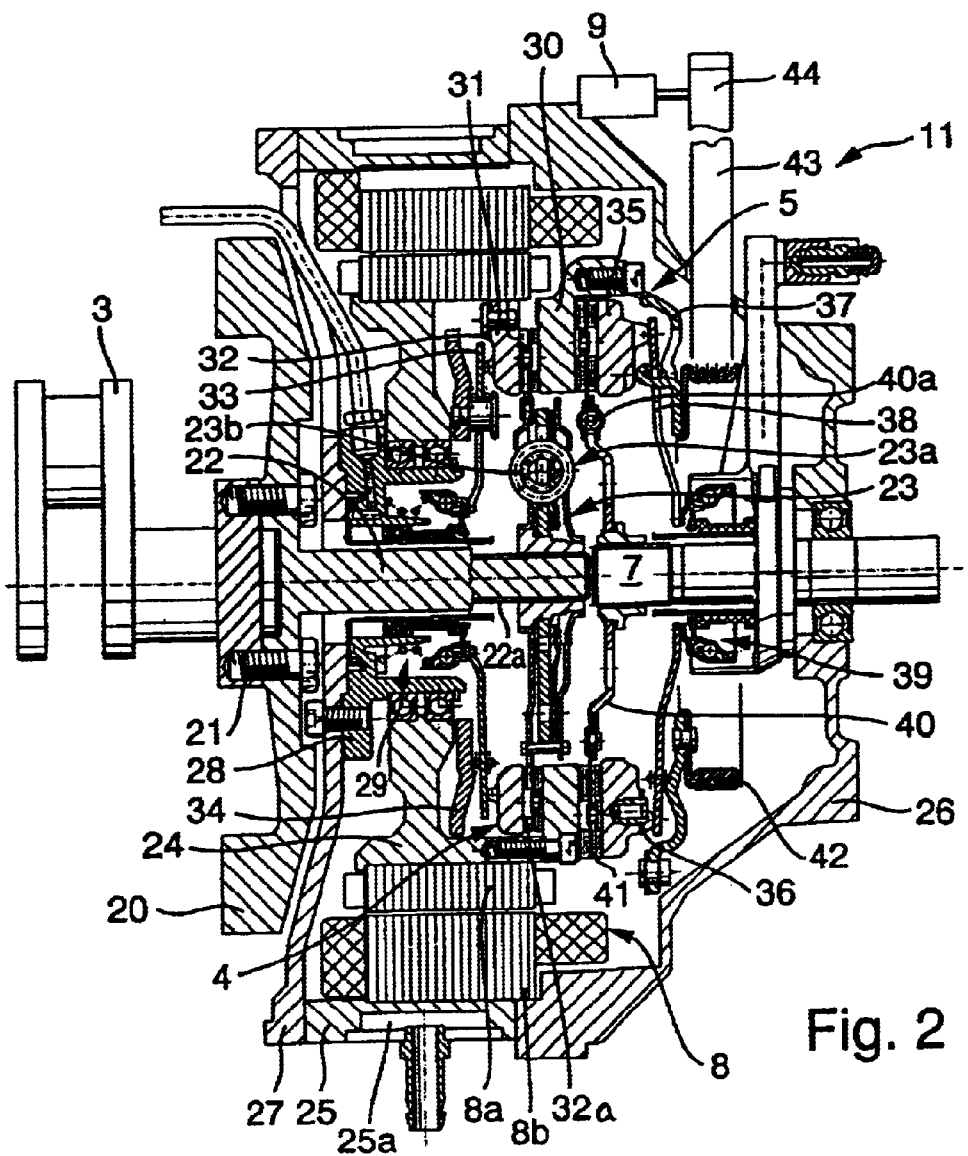
FIG. 2 is a longitudinal cross-sectional view of an illustrative embodiment of an inertial energy storage device in accordance with the present invention.

FIG. 2 shows a longitudinal section of an illustrative embodiment of an inertial energy device 11. A flywheel 20 is fastened by screws 21 to crankshaft 3 of the engine, which is not further illustrated. In the area of its axis of rotation the flywheel includes an axially-extending stub shaft 22, on which a clutch disk 23 is non-rotatably carried by means of a spline 22a for transmitting torque from the engine to a rotatable, disk-shaped swing-weight unit 24 that also acts as the rotor carrier for rotor 8a of electrical machine 8 when clutch 4 is engaged.

In the illustrated embodiment, electrical machine 8 acts as an energy converter and includes a stator 8b next to a rotor 8a. Stator 8b is non-rotatably connected with a housing section 25. One side of housing section 25 is connected with transmission housing cap 26. Housing section 25 carries coolant lines 25a for cooling electrical machine 8, and on the side facing the engine housing section 25 carries a plate element 27, which includes a bearing portion 28 that is connected with plate element 27 by screws and that rotatably supports rotor carrier 24 and receives disengagement device 29.

Clutch 4 is a friction clutch that includes a pressure plate 30 that is axially firmly joined to rotor 8a, and a pressure plate 31 that is axially displaceable by leaf springs 32 attached to rotor 8a or to pressure plate 30, whereby when clutch 4 is engaged friction linings 32a of clutch disk 23 are brought into frictional. engagement by means of disengagement device 29, against the reaction of an axially-operative spring 33, which is actuated through disengagement device 29, and that is supported between axially-movable pressure plate 31 and a flange element 34 that is affixed to rotor carrier 24.

Pressure plate 30, which is non-rotatably connected with rotor 8a, is simultaneously the pressure plate of second clutch 5, the corresponding, axially-displaceable pressure plate 35 of which is non-rotatably attached to clutch cover 37 by means of leaf springs 36. Clutch cover 37 is rigidly joined with pressure plate 30 radially outside pressure plate 35. Pressure plate 35 is pressed axially against pressure plate 30 by an axially-operative spring 38, which in this example is in the form of a disk spring and which is supported axially between pressure plate 35 and clutch cover 37, and which is actuated by disengaging device 39, whereby clutch disk 40, which is non-rotatably connected with transmission input shaft 7, can be connected with rotor 8a by means of frictional engagement of friction linings 41.

Firmly affixed to clutch cover 37 is a belt pulley 42 over which a flat belt 43 passes that drives another belt pulley 44, or in further embodiments several belt pulleys, to drive accessories 9. An accessory 9 is shown in FIG. 2 only in schematic form and advantageously can be mounted outside housing 26 in a mounting space initially intended for a starter. Accessory 9 can be an air-conditioning compressor, a power steering pump, and the like, and is firmly joined with housing parts 25, 26, and/or 27. The transmission ratio determined by belt 43 and belt pulleys 42, 44 is designed for an advantageous range of rotational speeds of the accessory, and it can be of the order of about 1:1.

It should be understood that both disengaging devices 29, 39 can be situated in a position wherein two separate, radially nesting disengaging devices, or a single one, operate both clutches 4 and 5, which are then suitably arranged. Such embodiments are described in German Patent Publication DE 199 25 332.3, the entire disclosure of which is hereby incorporated by reference herein to the same extent as if fully rewritten, and they can advantageously be coupled with the accessory in the manner described herein.

Accessory 9 can particularly be an air-conditioning compressor, which in normal operation compresses a critical gas, for example carbon dioxide, ammonia, fluorohydrocarbon compounds, or the like, so that the accessory can operate as a thermodynamic energy storage device and, when the engine is shut off, it can continue air-conditioning of the passenger area of the vehicle.

The method of operation of inertial energy device 11 of FIG. 2 is as follows: When the vehicle is stationary the engine is started by electrical machine 8, for example by a direct start with clutch 4 engaged and with clutch 5 disengaged, and/or with the transmission selected to be in the neutral position, or by accelerating rotor 8a when clutches 4, 5 are disengaged and then engaging. clutch 4.

During acceleration, the engine will drive the vehicle through crankshaft 3 with both clutches 4, 5 engaged, and also at a suitable speed or at a selected drive mode. In the case of sufficient energy having been stored, inertial energy device 11 can provide additional assistance, for example by feeding energy of rotation from rotor 8a with rotor carrier 24, that is, by motive power from electrical machine 8. Alternatively, the engine can drive electrical machine 8, as a result of which it will feed electrical energy to an energy storage device. In both instances accessory 9 is driven.

When decelerating, the engine is at idle and clutch 4 is disengaged and clutch 5 is engaged. When needed, kinetic energy is fed from the drive wheels through the transmission into inertial energy device 11, which, depending upon a maximum efficiency, utilizes this torque to operate inertial energy device 11 or accessories 9, and/or to produce other forms of energy in accessory 9, to generate electrical energy by means of electrical machine 8, or to store rotational energy in rotor carrier 24 and rotor 8a, as a result of which the vehicle can be braked (recuperation). Additional deceleration can be achieved if necessary by using the vehicle brakes.

To move in reverse, to coast, to move forward moderately, or the like, the stored rotational energy can be used to start or to drive when clutch 4 is disengaged and clutch 5 is engaged. Alternatively, or additionally, the vehicle can be driven by electrical machine 8. To start the engine clutch 4 is engaged. In order to lessen the jolt when restarting the engine, electrical machine 8 can be switched on to assist in starting, and additionally, or alternatively, the accessory can be operated at a lesser power drain for a short time. This procedure can be implemented for example by disengaging the accessory from the power train or, for example, by briefly venting a pump or a vacuum pump.

The illustrative power train 1 of FIG. 1, when fitted with the illustrative inertial energy device 11 of FIG. 2, can advantageously be provided with suitable damping devices to damp the engine's torsional vibrations. Thus, clutch disk 23, as shown, can include a known torsional vibration damper 23a. Additionally, or alternatively, and corresponding with requirements, clutch disk 40 can include a torsional vibration damper, or at least a device 40a for preventing crankshaft 3 and transmission input shaft 7 from shifting axially. Moreover, it can be advantageous to use the damping effect provided by two masses that are rotatable relative to each other against the effect of vibrations, at least one of which is a circumferentially operative energy storage device, whereby, for example, pressure plate 30 and rotor carrier 24 with rotor 8a are rotatable relative to each other to provide flywheel masses for opposing the effect of accumulator 23b.

Measures can be taken for damping axial and bending vibrations in crankshaft 3. For example, flywheel 20 can be designed to be axially elastic, and/or, especially, clutch disk 23 damps and/or isolates axial vibrations.

To reduce the axial mounting space, it can be advantageous, furthermore, to house pressure plate 30, with commensurate design of the friction linings, radially inside rotor 8a, or to arrange belt pulley 42 in the vicinity of the outside periphery of clutch cover 37, and, where it can be advantageous, the diameter of pressure plate 30 should be formed as small as possible.

Figure 3:
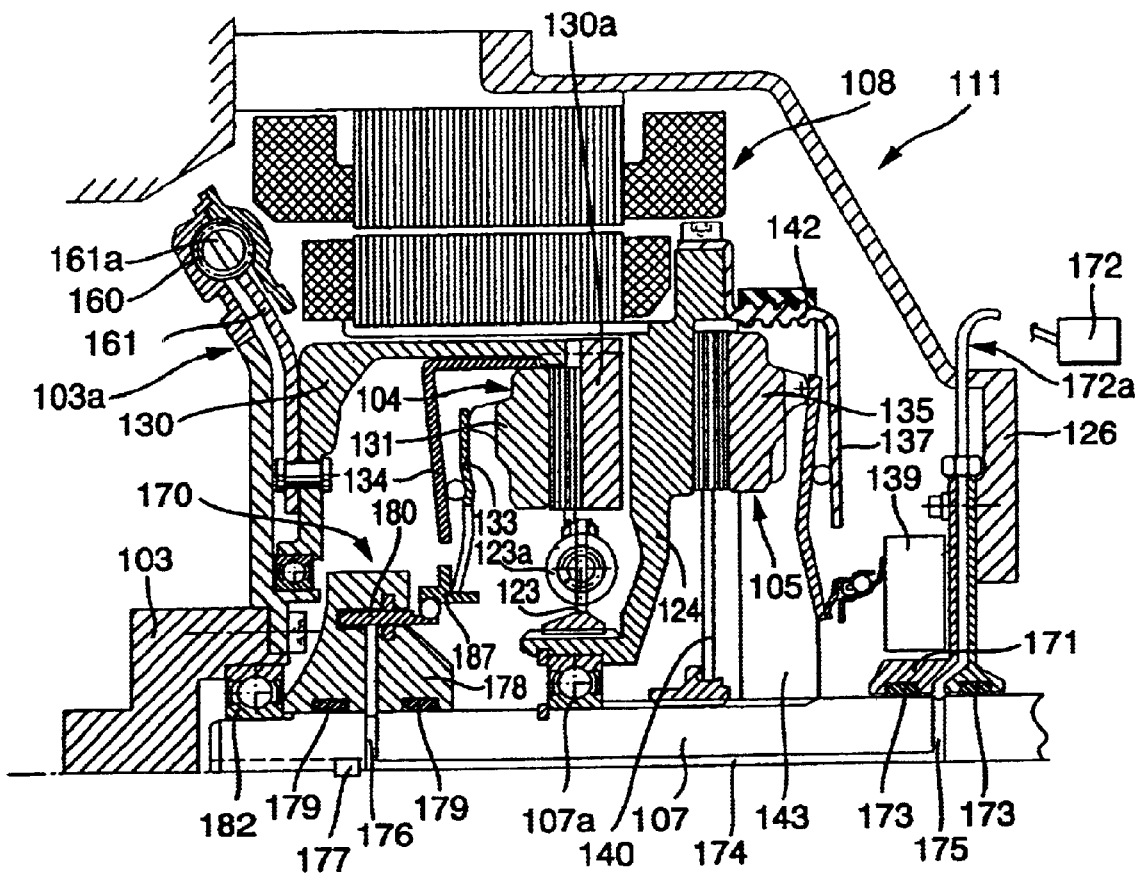
FIG. 3 is a longitudinal cross-sectional view of another embodiment of an inertial energy storage device in accordance with the present invention.

FIG. 3 shows an embodiment of an inertial energy device 111, which is identical in principle with the embodiment 11 of FIG. 2 and is different in its structural design, as discussed below.

Belt pulley 142 that receives belt 143 is embossed directly into clutch cover 137 and is approximately the same size externally, both axially and radially, as axially displaceable pressure plate 135 of clutch 105, which is operative in the path of the transmitted power between electrical machine 108 and transmission input shaft 107, and which transmits to transmission input shaft 107 by means of clutch disk 140 the torque introduced by crankshaft 103 and/or by energy converter 8, and which is operated by disengaging device 139 which is only schematically indicated.

The mounting of electrical machine 108 is implemented by a rotor carrier 124 which is rotatable by means of bearing 107a on transmission input shaft 107. Clutch disk 123, along with a damping device 123a, is non-rotatably received on rotor carrier 124. Pressure plate 30 of FIG. 2, which is a unitary structure and which is operative for both clutches 4, 5, is provided separately in embodiment 111. Flange element 130 constitutes a secondary part to form a two-mass flywheel. Pressure plates 130a and 131 are provided on flange element 130, in connection with which pressure plate 131 is attached in an axially displaceable and non-rotational manner to pressure plate 130a or to flange 130. The two-mass flywheel is constituted by the secondary part, flange 130, and the primary part 103a that is affixed to crankshaft 103, whereby primary part 103a and the secondary part are relatively rotatable against the effect of the energy accumulator, which is circumferentially-distributed helical springs. In this connection, flange element 161 acts as the secondary-side loading device 161a for energy accumulator 160 and is supplied at a circumferential side end, while primary part 103a of the energy accumulator is applied at its other circumferential side end, for example by means of embossed recesses (not shown). Primary part 103a and flange 161 can, as shown, be angled or bent in an axial direction on their outer ends and the outer contour of electrical machine 108 can thereby be reduced.

Disengaging device 170 disclosed herein, which is shown merely schematically, is advantageous particularly for all power trains for which two clutches can be advantageous. Previous systems had either to be controlled from two sides, the transmission side and the engine side, or the control of the engine-side clutch had to occur by means of complicated implementations through the transmission-side clutch.

Disengaging device 170 is for that reason operated hydraulically, whereby a feed arrangement 171 is attached to transmission housing 126 for supplying master cylinder 172 through conduit 172a. Pressure medium is provided in transmission input shaft 107 and is sealed against it by seals 173. A borehole 174 with an inlet bore 175 and an outlet bore 176 is provided in transmission input shaft 107 and forms the pressurized-medium conduit in that area. Borehole 174 is closed by a stopper 177 at the axial position of outlet conduit 176, and a disengaging cylinder 178 is rotatably carried on transmission input shaft 107 and is sealed by seals 179 that bear against the shaft. Disengaging piston 180 is axially displaceable as a function of the pressure applied by master cylinder 172 and presses against disk spring 133 through disengaging bearing 187. Spring 133 is supported by a clutch cover portion 134, which is shown only in a schematic form, and by pressure plate 131, and by withdrawing pressure plate 131 it effects the disengagement of clutch 104. The axial support for the disengaging cylinder is provided by pilot bearing 182.

Figure 4:
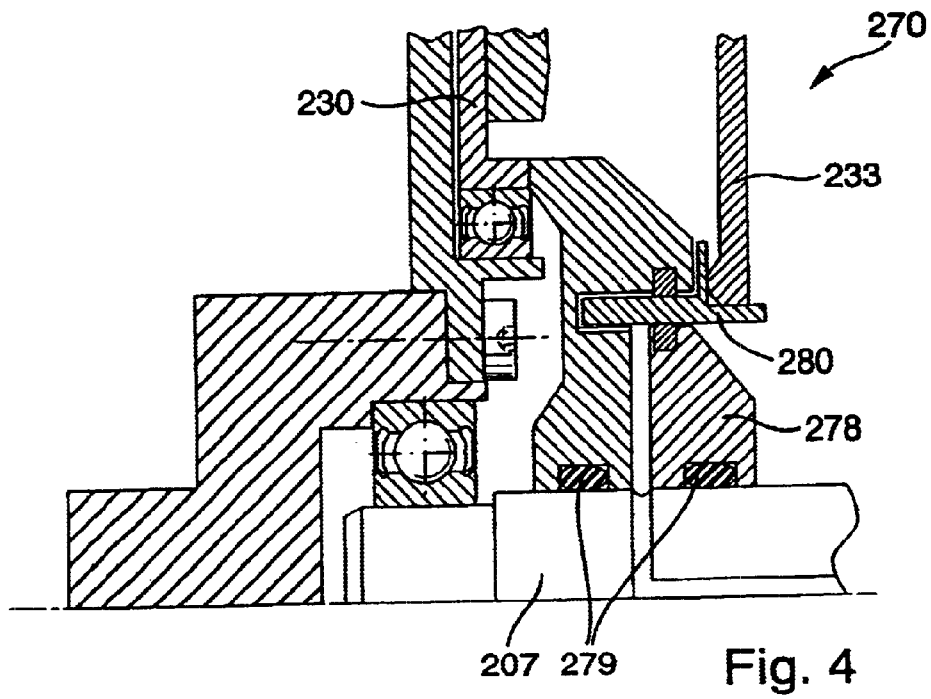
FIG. 4 is a detail view of another embodiment of a disengaging device for use with an inertial energy storage device of the type shown in FIG. 3.

It is to be understood that the pressure conduit within the transmission input shaft can in every other configuration advantageously include a slave cylinder for operating a clutch that is axially between the crankshaft and a further clutch FIG. 4 shows a modified detail of inertial energy device 111 of FIG. 3, with a disengaging device 270 of which disengaging cylinder 278 is rotatably carried on transmission input shaft 207 and is sealed by seals 279. Disengaging cylinder 278 is non-rotatably connected with secondary portion 230, and it therefore rotates at the same angular speed as the clutch (see FIG. 3, clutch 104) and hence also with disk spring 233, so that a disengagement bearing between piston 280 and disk spring 233 can be eliminated.

Figure 5:
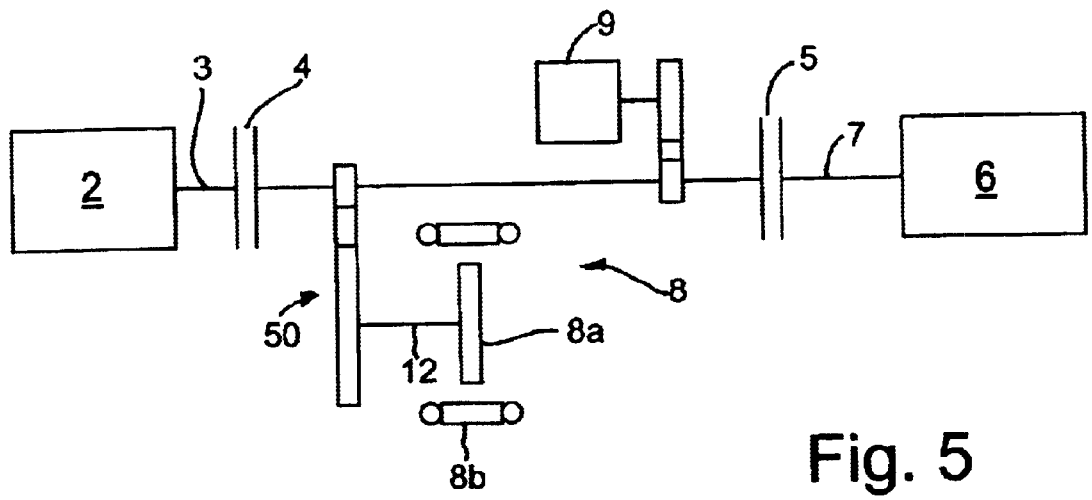
FIG. 5 schematically shows another embodiment of a power train in accordance with the present invention.

FIG. 5 shows an embodiment in which energy converter 8 is mounted approximately axially parallel to the axis of drive shaft 3. A power transmission path is provided between the axis of drive shaft 3 and energy converter 8 in the form of a belt drive 50. Instead of a belt drive, a continuously variable drive, a gear drive, or the like, can also be utilized, for example using a chain drive or a gear drive.

Figure 6:
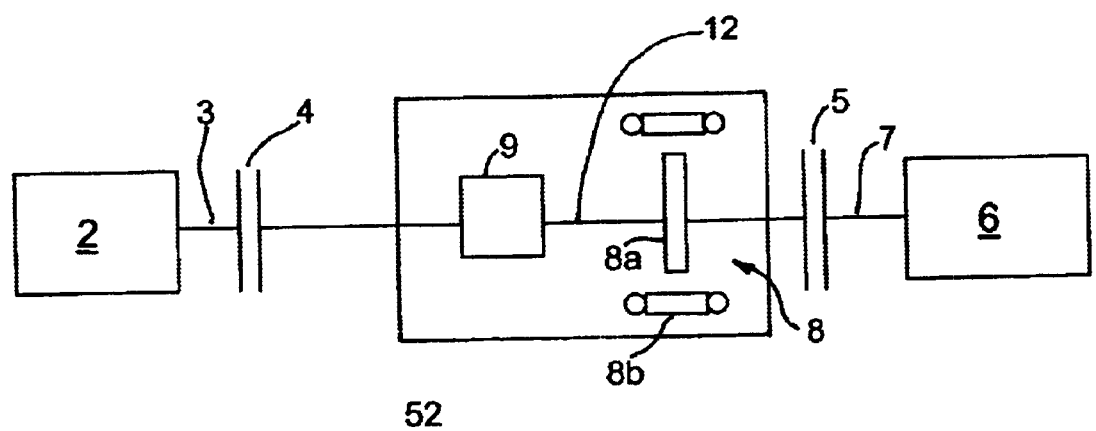
FIG. 6 schematically shows a further embodiment of a power train in accordance with the present invention.

FIG. 6 shows an embodiment in which the at least one accessory 9 is arranged in a unitary structure 52 that includes accessory 9 and energy converter 8.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A power train comprising: an internal combustion engine having a drive shaft; a unitary power transmission having an input shaft for receiving power and an output shaft for driving at least one drive wheel, wherein the power transmission is situated downstream of the engine in a power pathway that includes the engine and the power transmission; a rotatable energy converter situated in the path of power transmission between the engine and the power transmission; a first clutch for selectively engaging and disengaging the engine from the energy converter and from the power transmission; and at least one accessory drivingly connected with the energy converter.

2. A power train in accordance with claim 1, wherein the energy converter is connected with a storage device for receiving and/or emitting electrical energy, energy of rotation and/or thermodynamic energy.

3. A power train in accordance with claim 1, including a second clutch for selectively engaging and disengaging the energy converter from the power transmission.

4. A power train in accordance with claim 1, wherein the accessory is a pump.

5. A power train in accordance with claim 1, wherein the accessory is a compressor.

6. A power train in accordance with claim 1, wherein the energy converter is mounted coaxially with the engine drive shaft.

7. A power train in accordance with claim 1, wherein the energy converter is mounted outwardly of and parallel with the engine drive shaft.

8. A power train in accordance with claim 1, wherein the at least one accessory is mounted coaxially with the engine drive shaft.

9. A power train in accordance with claim 1, wherein the at least one accessory is mounted outwardly of and parallel with the engine drive shaft.

10. A power train in accordance with claim 7, wherein the axially parallel energy converter is connected with the power train by a belt drive.

11. A power train in accordance with claim 9, wherein the axially parallel accessory is connected with the power train by a belt drive.

12. A power train in accordance with claim 11, wherein the belt drive is a continuously variable transmission.

13. A power train in accordance with claim 10, wherein the belt drive is a continuously variable transmission.

14. A power train in accordance with claim 1, wherein the at least one accessory is driven by energy provided by the energy converter.

15. A power train in accordance with claim 3, wherein when the vehicle is decelerating one at least of the first and second clutches is disengaged.

16. A power train in accordance with claim 3, wherein when the vehicle is in a coasting mode the second clutch is engaged and the energy converter converts vehicle kinetic energy into another form of energy.

17. A power train in accordance with claim 1, wherein the energy converter exchanges energy with at least one accessory.

18. A power train in accordance with claim 1, wherein the vehicle is decelerated by the input of power to the at least one drive wheel, through the power transmission, to the energy converter.

19. A power train in accordance with claim 1, wherein energy from the energy converter to the at least one accessory is stored as thermodynamic energy.

20. A power train in accordance with claim 1, wherein energy from the energy converter to the at least one accessory is used to compress a critical gas.

21. A power train in accordance with claim 1, wherein the energy converter includes at least one electrical machine for converting kinetic and electrical energy into each other.

22. A power train in accordance with claim 1, wherein the energy converter converts at least kinetic energy and energy of rotation into each other.

23. A power train in accordance with claim 1, wherein the energy converter is connected with a storage device for receiving and/or emitting electrical energy.

24. A power train in accordance with claim 1, wherein the energy converter is connected with a storage device for receiving and/or emitting rotational energy.

25. A power train in accordance with claim 1, wherein the energy converter is connected with a storage device for receiving and/or emitting thermodynamic energy.

26. A power train in accordance with claim 3, wherein the first and second clutches and the energy converter are carried within a unitary housing.

27. A power train in accordance with claim 26, wherein at least one clutch is positioned radially inwardly of and axially opposite from a stator of the energy converter.

28. A power train in accordance with claim 3, wherein the first and second clutches include a common pressure plate.

29. A power train in accordance with claim 3, wherein the first and second clutches are axially adjacent to each other.

30. A power train in accordance with claim 1, including a second clutch for selectively engaging and disengaging the engine from the power transmission, wherein the first and second clutches each include a disengaging device, wherein the disengaging device of at least one clutch includes an hydraulic slave cylinder that can be pressurized with a pressure medium from a master cylinder through a pressure line, and wherein at least a portion of the pressure line is within the transmission input shaft.

31. A method of operating a motor vehicle accessory from a vehicle power train that includes an engine, a transmission operatively connected with at least one drive wheel, an energy converter positioned between the engine and the transmission to lie in a power pathway that extends from the engine to the at least one drive wheel, said method comprising the steps of:
  a. providing a unitary power transmission between the engine and the at least one drive wheel;
  b. providing a first clutch for selectively engaging and disengaging the engine from the energy converter; from the energy converter and from the power transmission;
  c. storing in the energy converter energy derived from rotational motion of at least one of the engine and the transmission; and
  d. driving a vehicle accessory with energy obtained from the energy converter.

* * * * *